Patented Dec. 4, 1951

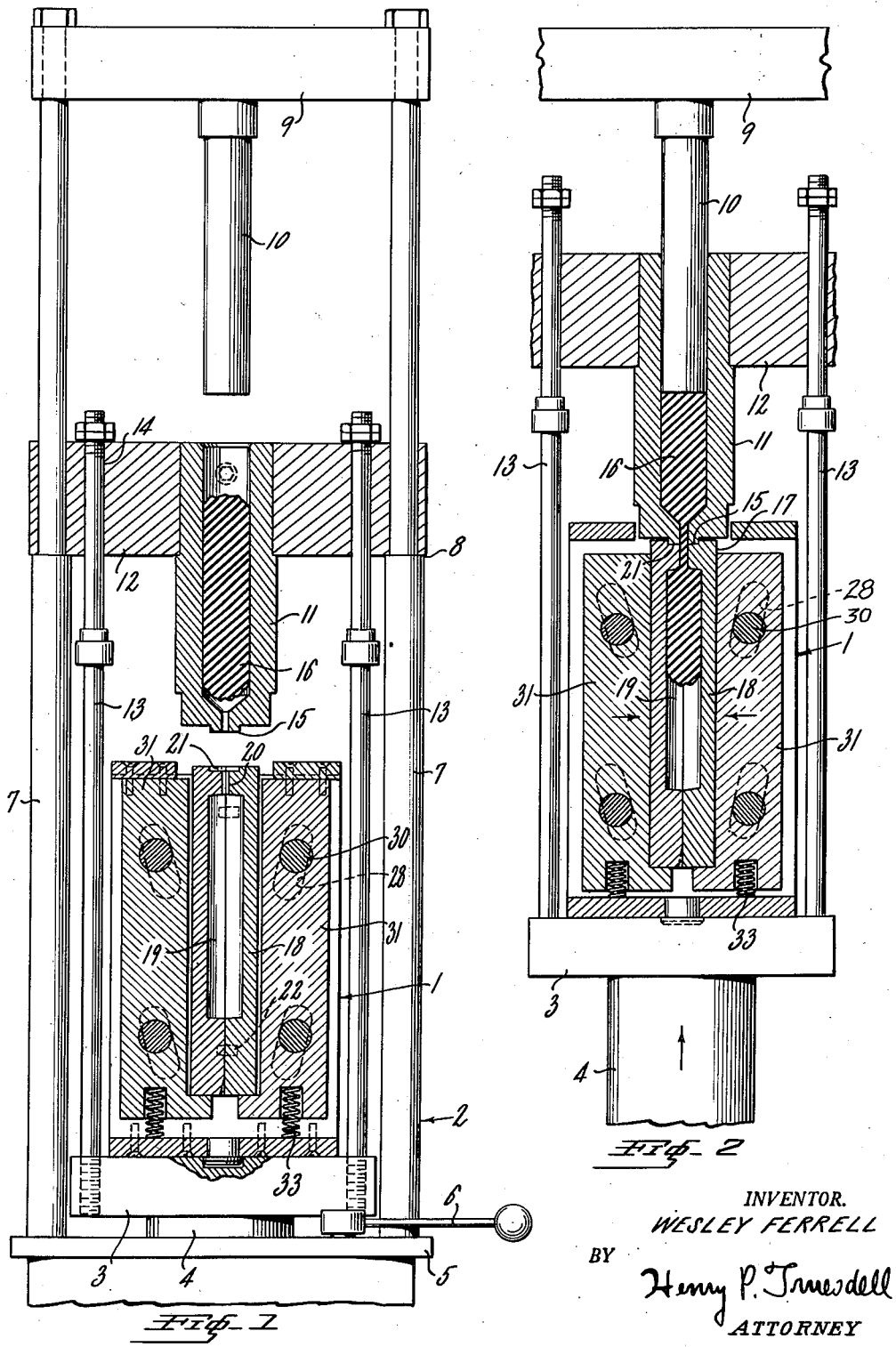

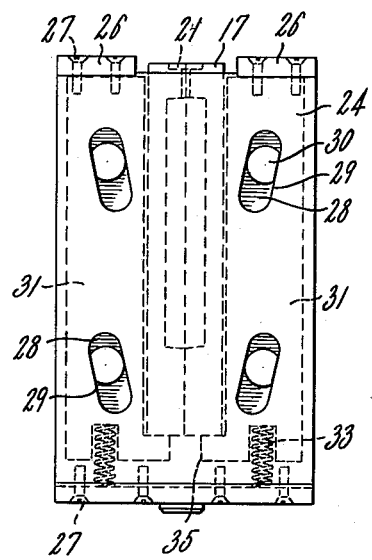
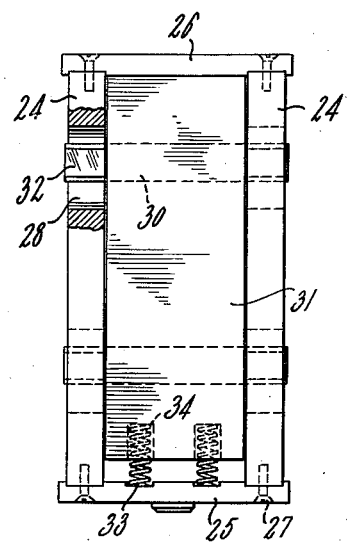
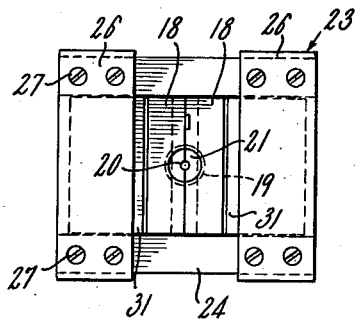
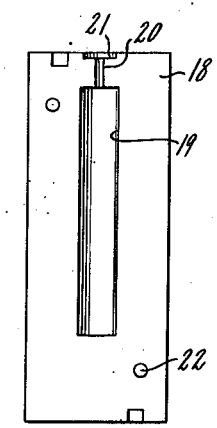

2,577,412

UNITED STATES PATENT OFFICE 2,577,412

MOLD CONSTRUCTION

Wesley Ferrell, Fair Lawn, N. J., assignor to United States Rubber Company, New York, N. Y., a corporation of New Jersey Application December 23, 1947, Serial No. 793,448

5 Claims. (Cl. 18—42)

My invention relates to molding apparatus and more particularly to a mold construction for injection molding of plastic material.

One type of injection molding machine for making small articles utilizes a single hydraulic ram which supplies both the pressure needed to keep the mold closed and the pressure needed to inject the hot plastic material into the mold. The mold construction itself has a split wedge mold insert which fits into a relatively large block, the insert being wedged tightly into the block by the action of the hydraulic ram during the molding operation. Although in many instances this type of mold is ideal for making small articles, one disadvantage is that the dimension of the molded article in a direction parallel to that of the applied pressure has been limited. One reason for this limitation is that, as a practical matter, the angle of the wedge must be approximately 12 degrees to the direction of pressure. If the angle is much less, the two wedge parts of the mold will stick in the mold block; if the angle is much greater, the component of applied pressure which acts to hold the two parts of the mold together is too small so that the plastic material leaks from the mold cavity. With such practical restrictions on the shape of the mold insert, any mold which is long in the direction of applied pressure becomes very heavy and bulky and is difficult, if not impossible, to fit into the press. In certain instances, the difficulty has been overcome by making the long dimension of the mold at right angles to the direction of applied pressure and providing the mold with a side gate for receiving the plastic material; such an arrangement has the disadvantage that separate hydraulic rams are required to clamp the mold closed and for injecting the plastic material. My invention overcomes the aforementioned deficiencies by providing a mold construction which may be used with a single hydraulic ram to injection mold articles having their long dimension in the direction of applied pressure.

Therefore, it is an object of my invention to provide a new and improved mold construction, for use with a single hydraulic ram for holding the mold closed and injecting plastic material.

It is another object of my invention to provide a mold construction which may be easily taken apart and which is of a simple yet rugged construction.

Still another object of my invention is the provision of an improved two-part mold construction in which the two parts of the mold insert are wedged tightly together throughout the entire length of the mold.

A further object of my invention is to provide a mold construction which is adapted to receive interchangeable mold cavities for molding a wide variety of articles.

In the accompanying drawings:

Fig. 1 illustrates a mold constructed in accordance with my invention in readiness on a hydraulic press for the injection molding operation the mold being shown in section;

Fig. 2 illustrates the positions of the mold parts as compound is being forced into the mold insert;

Fig. 3 is a side view of the mold construction;

Fig. 4 is an end view of the mold;

Fig. 5 is a top view of the mold construction of Fig. 3; and

Fig. 6 is a face view of the one-half of the two-part insert forming the mold cavity.

Referring to the drawings, Fig. 1 illustrates a mold structure 1, which is constructed in accordance with my invention, and which is adapted to be mounted on a single ram hydraulic operated injection press 2. It rests on a platen 3 which is adapted to be moved upwardly by a hydraulic ram 4 movable from the base 5 of the press. An operating handle 6 controls the operation of the press. The hydraulic press includes spaced uprights 7 having shoulders 8 and which extend upwardly from the base 5. They carry a fixed upper crosshead 9. A ram 10 is carried by the upper crosshead 9 and is adapted to mate with a heating cylinder 11 carried by a movable crosshead 12 which floats on the uprights 7. In normal position, the crosshead 12 rests on the shoulders 8, as illustrated in Fig. 1. In order to guide the movement of the platen 3 as it moves upwardly, a plurality of guide rods 13 are carried by the platen and extend upwardly through openings 14 in the movable crosshead 12.

In operation of the press, as the platen 3 moves upwardly it carries the mold construction 1 into engagement with the nozzle 15 on the lower end of the heating cylinder 11 and which contains a charge 16 of moldable material. Further movement of the platen lifts the movable crosshead 12 from shoulders 8 so that it moves along the uprights 7. Upon continued upward movement of the platen and mold, the ram 10 is inserted in the bore of the cylinder 11 so that it engages the body of plastic moldable material to force it downwardly into the mold cavity, in the manner illustrated in Fig. 2. It will be apparent that the operation of the press is such that the force exerted by the hydraulic ram 4 is used to provide a tight fit between the injection nozzle 15 and the mold construction and also to provide the force for injecting the moldable material into the mold cavity. In addition, the pressure developed by the press is utilized to hold the two parts of the mold cavity together in a manner to be described below.

Turning now to the construction of the mold 1, and referring to Figs. 3 to 6, inclusive, it will be seen that the mold includes a mold insert 17 which is adapted to receive the charge of moldable material. The mold insert is made in two parts 18, one of which is shown in Fig. 6. Each part contains a mold cavity 19 and a feed channel 20. A recess 21 is provided to receive the nozzle 15 of the press and dowel pins 22 are provided which mate with dowel holes in the other part of the mold insert. When the two parts of the mold are assembled together, a mold cavity is formed by the mold recesses 19 which is of any desired shape depending upon the article being molded.

The mold also includes a frame 23 comprising opposite side plates 24 held together and assembled in parallel relationship by means of a bottom plate 25 and two spaced top plates 26. The plates are held together by any suitable means such as the screws 27. Each of the side plates 24 is provided with a plurality of slots 28, in this case four. As shown in Fig. 3, the slots are elongated with rounded ends and each is provided with a machined surface 29 disposed at an angle of approximately 12° to a vertical center line through the mold construction. The slots 28 are adapted to receive the ends of pins 30, two of the pins being mounted in each one of two supporting members 31. The ends of each pin 30 are provided with hardened machined surfaces 32 formed at an angle of approximately 12° to the vertical wall of the supporting member; these surfaces cooperate with the inclined surfaces 29 of the slots.

The supporting or clamping members 31 are assembled within the frame 23 with the ends of the pins 30 extending into the slots 28. The two supporting members 31 are assembled in spaced parallel relationship, as illustrated in Figs. 1 and 3, and each rests on a plurality of springs 33 carried by the bottom plate 25. The springs extend into recesses 34 in the supporting members. Each of the supporting members 31 is provided with an offset portion 35 which forms a foot on which the mold insert 17 rests. The arrangement is such that the supporting members 31 form, in effect, a floating cradle in which the mold insert 17 is seated, as illustrated in Fig. 3.

The operation of the mold is best illustrated in Fig. 2. As the mold moves upwardly with the platen 3 the mold insert 17 engages the heating cylinder 11 so that the injection nozzle 15 is seated in the recess 21. As the mold continues to move upwardly, the mold insert 17 and the supporting members 31 which carry it move downwardly against the springs 33. This means that the pins 30 riding in the cam slots 28 cause the supporting members 31 to move together to exert a tight clamping pressure on the two parts of the mold insert. After the two parts of the mold have been tightly closed in this manner, the ram 10 is in a position such that it forces a charge of the moldable material into the mold cavity. On the completion of the molding operation, the platen 3 is lowered thereby releasing the mold insert 17 which may be readily removed from the supporting members 31. Upon release of the press pressure, the springs 33 move the supporting members 31 upwardly so that the camming action of the slots 28 separates the members permitting easy removal of the mold insert.

The mold construction of my invention has the advantage that the mold insert is clamped tightly throughout its entire length making it possible to obtain a uniform molding of the article without internal strains. This is of particular importance when molding test specimens in laboratory molding operations. Moreover, the mold may be used with a wide variety of mold inserts having different shaped cavities for manufacturing various articles. It is not necessary to accurately machine the outside surfaces of the mold parts 18 inasmuch as the two parts of the mold are clamped tightly together by the action of the supporting members 31. In this connection, it should be noted that the members 31 float on the springs 33 and that each member is acted upon by two of the cam slots 28 so that both the upper and lower portions of the member are forced into tight clamping engagement with the mold insert 17. The springs 33 are of sufficient strength to support both the supporting members and the mold insert in initial position and they prevent the supporting members 31 from dropping down until such time as the mold pressure is applied. This prevents any misalignment of the parts. My mold construction makes it possible to mold strain free articles having a long dimension in the direction of molding pressure by the use of a single ram press instead of the more expensive double ram press.

Having thus described my invention, what I claim and desire to protect by Letters Patent is:

1. An injection mold construction comprising, in combination, a supporting frame having side walls provided with elongated slots disposed at an angle, spaced clamping members carried in said frame and being provided with pins extending through and movable in said slots, spring elements disposed between said frame and said clamping members supporting said members in said frame in operable alignment and a two-part mold insert which is freely inserted in said frame between and carried by said clamping members, said mold insert having a mold cavity and an opening leading thereto for injection of plastic material, said clamping members and mold insert being movable against the action of said springs to clamp the mold parts together.

2. A mold for use in injection molding operations, comprising a supporting frame, spaced movable clamping members carried in said frame, a split mold insert having a cavity therein and having an opening leading to said cavity for injection of plastic material and being freely located between the clamping members, resilient spring elements disposed between said frame and said clamping members supporting the clamping members in operable alignment, and means cooperating with the frame and clamping members to move the clamping members toward each other to clamp the mold parts together when pressure is applied to the mold insert against the action of said springs during a molding operation.

3. A mold for use in injection molding operations, comprising a supporting frame, spaced movable clamping members carried in said frame, a two-part mold insert having a cavity therein and having an opening leading to said cavity for injection of plastic material and being freely located between the clamping members, resilient spring elements disposed between said frame and said clamping members supporting the clamping members in operable alignment, and a pin and slot connection between the frame and clamping members to move the clamping members toward each other to clamp the mold parts together when pressure is applied to the mold insert against the action of said springs during a molding operation.

4. A mold for use in injection molding operations, comprising a supporting member, spaced movable clamping members mounted thereon, one of said members being provided with an elongated slot disposed at an angle and the other with a pin extending into said slot so that the clamping members are moved toward and away from each other upon movement relative to said supporting member, resilient spring elements disposed between said supporting member and said clamping members maintaining said clamping members in spaced apart relationship and operable alignment, and a split mold insert having a cavity therein and having a channel leading to said cavity for injection of plastic material and being freely carried by and located between the clamping members, said clamping members being moved together when pressure is applied to the mold insert against the action of said springs to clamp the mold parts together during a molding operation.

5. A mold for use in injection molding operations, comprising a supporting frame having spaced side walls provided with elongated slots having a surface disposed at an angle, spaced clamping members located in said frame and being provided with pins extending through and movable in said slots in engagement with said surfaces, said clamping members being movable toward and away from each other upon movement relative to said supporting frame, spring elements disposed between said frame and said clamping members supporting said clamping members in spaced apart relationship, a split mold insert having a cavity therein located between said clamping members, each of said clamping members being provided with a projecting portion for supporting said mold insert within said frame, said clamping members being moved toward each other to clamp the mold parts together when pressure is applied to the mold insert against the action of said springs during a molding operation.

WESLEY FERRELL.

REFERENCES CITED

The following references are of record in the file of this patent:

UNITED STATES PATENTS

| Number | Name | Date |
|---|---|---|
| 1,653,120 | Petersson | Dec. 20, 1927 |
| 1,881,232 | Kurath | Oct. 4, 1932 |
| 2,090,489 | Sommerfeld | Aug. 17, 1937 |
| 2,358,857 | Gits | Sept. 26, 1944 |